(12) United States Patent
Lee et al.

(10) Patent No.: US 12,450,808 B2
(45) Date of Patent: Oct. 21, 2025

(54) METHOD AND APPARATUS FOR MANAGING SMOKING INFORMATION

(71) Applicant: KT&G CORPORATION, Daejeon (KR)

(72) Inventors: Seonbong Lee, Daejeon (KR); Byeongyong Ahn, Daejeon (KR); So Hee Yoo, Daejeon (KR); Junhui Lee, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/022,594

(22) PCT Filed: Nov. 22, 2022

(86) PCT No.: PCT/KR2022/018503
§ 371 (c)(1),
(2) Date: Feb. 22, 2023

(87) PCT Pub. No.: WO2023/121007
PCT Pub. Date: Jun. 29, 2023

(65) Prior Publication Data
US 2024/0273797 A1     Aug. 15, 2024

(30) Foreign Application Priority Data
Dec. 23, 2021 (KR) .......... 10-2021-0186063

(51) Int. Cl.
*G06T 13/40*   (2011.01)
*A24F 40/50*   (2020.01)
*A24F 40/65*   (2020.01)

(52) U.S. Cl.
CPC ............ *G06T 13/40* (2013.01); *A24F 40/50* (2020.01); *A24F 40/65* (2020.01)

(58) Field of Classification Search
CPC .......... G06T 13/40; A24F 40/50; A24F 40/65; A24F 40/60; A24F 40/51; G06Q 30/016;
(Continued)

(56) References Cited

U.S. PATENT DOCUMENTS 6,545,682 B1 * 4/2003 Ventrella ................. G06F 3/011
                                                345/473
6,817,979 B2 * 11/2004 Nihtila ................. A61B 5/0002
                                                128/920

(Continued)

FOREIGN PATENT DOCUMENTS

| CN | 105848503 A | 8/2016 |
| JP | 2010-67240 A | 3/2010 |

(Continued)

OTHER PUBLICATIONS

Extended European Search Report issued Apr. 25, 2024 in European Application No. 22865873.8.
(Continued)

*Primary Examiner* — Motilewa Good-Johnson
(74) *Attorney, Agent, or Firm* — Sughrue Mion, PLLC

(57) ABSTRACT

According to an example, to manage smoking information, an avatar is generated to be associated with a user of an electronic device, smoking information of the user is received from an additional device connected to the electronic device, an appearance of the avatar is changed based on the smoking information, and the avatar with the appearance changed is output.

17 Claims, 8 Drawing Sheets

(58) Field of Classification Search
CPC ........ G06Q 50/22; G06Q 50/10; G16H 40/63; G16H 40/67; G16H 50/30; G16H 20/70; G16H 10/60; H04W 88/02
See application file for complete search history.

(56) References Cited

U.S. PATENT DOCUMENTS

| | | | | |
|---|---|---|---|---|
| 11,517,042 | B2* | 12/2022 | Gorelick | A24F 13/02 |
| 2008/0301556 | A1* | 12/2008 | Williams | G06T 13/40 |
| | | | | 715/706 |
| 2009/0325701 | A1 | 12/2009 | Andres Del Valle | |
| 2012/0254749 | A1* | 10/2012 | Downs, III | G16H 40/67 |
| | | | | 715/706 |
| 2013/0038601 | A1* | 2/2013 | Han | G06F 3/011 |
| | | | | 345/473 |
| 2013/0319439 | A1 | 12/2013 | Gorelick et al. | |
| 2014/0156308 | A1 | 6/2014 | Ohnemus et al. | |
| 2016/0086500 | A1* | 3/2016 | Kaleal, III | A61B 5/43 |
| | | | | 434/257 |
| 2016/0285983 | A1* | 9/2016 | Liu | G16H 40/67 |
| 2017/0080346 | A1* | 3/2017 | Abbas | A63F 13/79 |
| 2018/0254097 | A1* | 9/2018 | Gani | G06F 3/013 |
| 2020/0273583 | A1 | 8/2020 | Jain et al. | |
| 2021/0382544 | A1* | 12/2021 | Butcher | G06T 13/80 |
| 2022/0172435 | A1* | 6/2022 | Itabashi | H04L 67/12 |
| 2024/0188639 | A1* | 6/2024 | Kim | A24F 40/53 |
| 2024/0265614 | A1* | 8/2024 | Lee | A24F 40/50 |
| 2024/0268483 | A1* | 8/2024 | Yoo | A24F 40/65 |

FOREIGN PATENT DOCUMENTS

| | | |
|---|---|---|
| JP | 2020-68739 A | 5/2020 |
| KR | 10-1008639 B1 | 1/2011 |
| KR | 10-2012-0094400 A | 8/2012 |
| KR | 10-2020-0019673 A | 2/2020 |
| KR | 10-2020-0107395 A | 9/2020 |
| WO | 2020/194518 A1 | 10/2020 |

OTHER PUBLICATIONS

Tylar Murray, et al., "Avatar Interfaces for Biobehavioral Feedback", Jul. 21, 2013, Topics in Cryptology—CT-RSA 2020: The Cryptographers' Track At the RSA Conference 2020, Feb. 24-28, 2020, San Francisco, CA (10 pages total).

Communication dated Aug. 29, 2024 in Korean Application No. 10-2021-0186063.

Communication dated Oct. 15, 2024 in Japanese Application No. 2023-509600.

Communication dated Jul. 31, 2025 in Chinese Application No. 202280006663.7.

* cited by examiner

METHOD AND APPARATUS FOR MANAGING SMOKING INFORMATION

CROSS REFERENCE TO RELATED APPLICATIONS

This application is a National Stage of International Application No. PCT/KR2022/018503 filed Nov. 22, 2022, claiming priority based on Korean Patent Application No. 10-2021-0186063 filed Dec. 23, 2021.

TECHNICAL FIELD

The following embodiments relate to a technique for managing smoking information and, more specifically, to a technique for visually displaying smoking information to a user.

BACKGROUND ART

The demand for electronic cigarettes, or e-cigarettes, has recently been on the rise. The rising demand for e-cigarettes has accelerated the continued development of e-cigarette-related functions. The e-cigarette-related functions may include, in particular, functions according to the types and characteristics of e-cigarettes.

DISCLOSURE OF THE INVENTION

Technical Goals

An embodiment may provide a method of managing smoking information performed by an electronic device.
An embodiment may provide an electronic device for managing smoking information.

Technical Solutions

According to an embodiment, a method of managing smoking information, performed by an electronic device, includes generating an avatar to be associated with a user of the electronic device, receiving smoking information of the user from an additional device connected to the electronic device, changing an appearance of the avatar based on the smoking information, and outputting the avatar with the appearance changed.

The generating of the avatar may include determining a basic appearance of the avatar based on user information about the user, and generating the avatar to represent the basic appearance visually.

The generating of the avatar may further include receiving the user information from the additional device.

The user information may be generated based on sensing information measured by one or more sensors in the additional device.

The smoking information may include at least one of a blood pressure, an electrocardiogram, and a blood oxygen saturation sensed by the additional device.

The smoking information may include at least one of a skeletal muscle mass, a basal metabolic rate, a body water content, and a body fat mass sensed by the additional device.

The smoking information may include an amount of smoking sensed by the additional device.

According to an embodiment, an electronic device includes a memory configured to store a program for managing smoking information, and a processor configured to execute the program, wherein the processor may be configured to generate an avatar to be associated with a user of the electronic device, receive smoking information of the user from an additional device connected to the electronic device, change an appearance of the avatar based on the smoking information, and output the avatar with the appearance changed.

The electronic device may be a mobile communication terminal.

According to an embodiment, a method of managing smoking information, performed by an electronic device, includes generating an avatar to be associated with a user of the electronic device, generating smoking information of the user using one or more sensors in the electronic device, changing an appearance of the avatar based on the smoking information, and outputting the avatar with the appearance changed.

Effects

It is possible to provide a method of managing smoking information performed by an electronic device.
It is possible to provide an electronic device for managing smoking information.

BEST MODE FOR CARRYING OUT THE INVENTION

Figure 1:
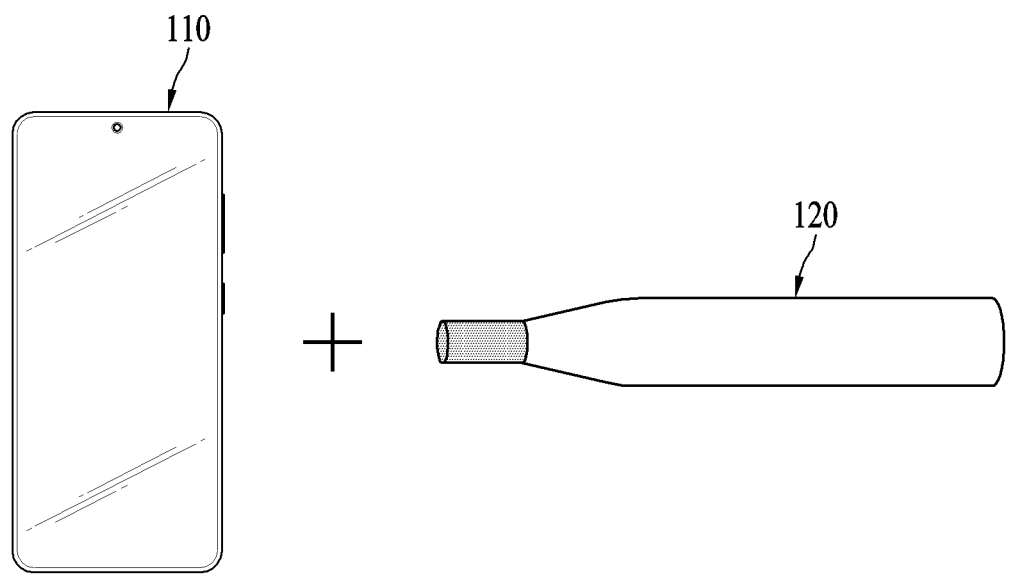
FIG. 1 illustrates a system for managing smoking information according to an embodiment.

The following detailed structural or functional description is provided as an example only and various alterations and modifications may be made to the examples. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates a system for managing smoking information according to an embodiment.

According to an embodiment, a system 100 for managing smoking information may include a user terminal 110 and an aerosol generating device 120. Each of the user terminal 110 and the aerosol generating device 120 may be an electronic device.

For example, the user terminal 110 may be a mobile communication terminal. The configuration of the user terminal 100 will be described in detail with reference to FIG. 9.

For example, the aerosol generating device 120 may be referred to as an electronic cigarette device or a smoking stick. The aerosol generating device 120 will be described in detail below with reference to FIGS. 2 to 8.

A user may smoke as being provided with an aerosol generated by the aerosol generating device 120. For example, the aerosol generating device 120 may generate an aerosol by heating a cigarette inserted into the aerosol generating device 120. As another example, the aerosol generating device 120 may generate an aerosol using a material in a liquid-type cartridge or a replaceable cartridge in the aerosol generating device 120. The method by which the aerosol generating device 120 generates an aerosol is not limited to the embodiments described above.

According to an embodiment, the aerosol generating device 120 may generate smoking information about smoking of the user using various sensors included in the aerosol generating device 120, and transmit the smoking information to the user terminal 110. The user terminal 110 may manage the received smoking information. For example, the user terminal 110 may visually display the smoking information using an avatar. The user may visually recognize a health condition of the user by observing the avatar. A method of managing smoking information through an avatar will be described in detail below with reference to FIGS. 10 to 12.

Figure 2:
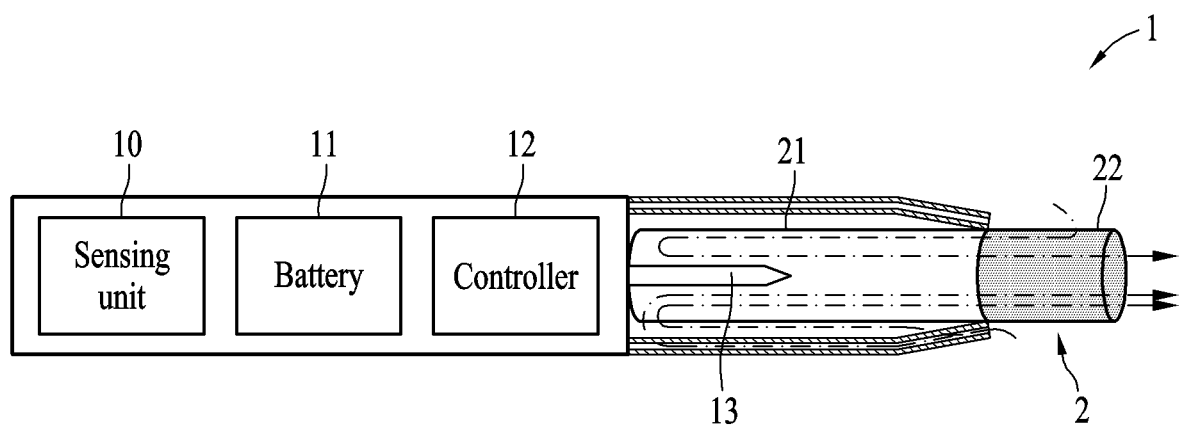
FIGS. 2 to 4 are diagrams illustrating examples of a cigarette inserted into an aerosol generating device according to an example.
Figure 3:
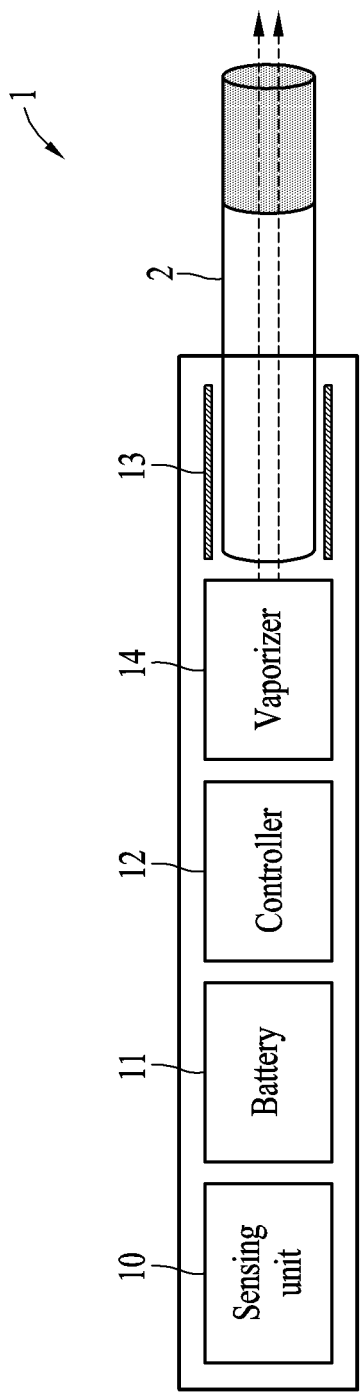
Figure 4:
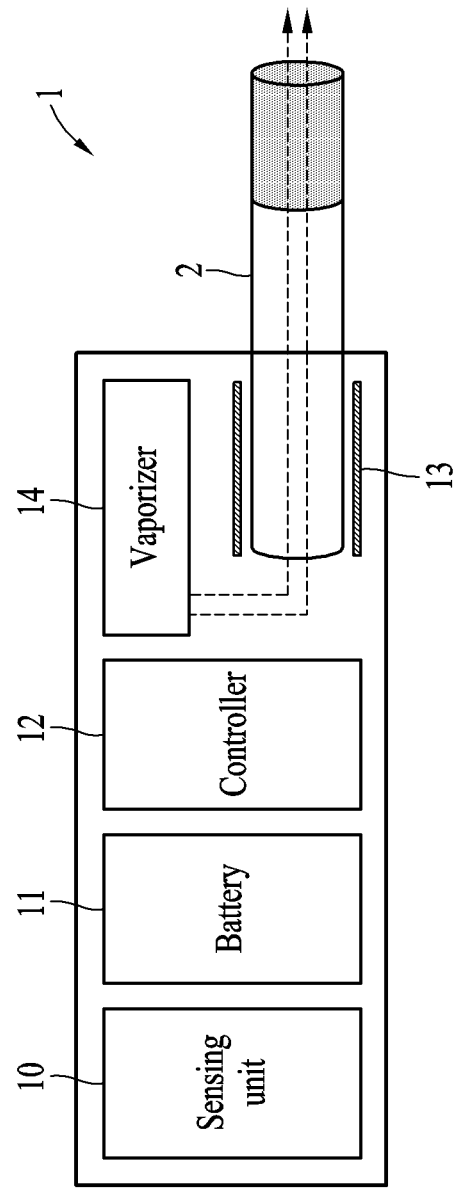

FIGS. 2 to 4 are diagrams illustrating examples of a cigarette inserted into an aerosol generating device according to an example.

Referring to FIG. 2, an aerosol generating device 1 may include a sensing unit 10, a battery 11, a controller 12, and a heater 13. Referring to FIGS. 3 and 4, the aerosol generating device 1 may further include a vaporizer 14. Further, a cigarette 2 may be inserted into an inner space of the aerosol generating device 1. The aerosol generating device 1 may be the aerosol generating device 120 described above with reference to FIG. 1.

According to an embodiment, the aerosol generating device 1 may further include a display.

The aerosol generating device 1 shown in FIGS. 2 to 4 may include components related to the embodiments described herein. Therefore, it is to be understood by those having ordinary skill in the art to which the present disclosure pertains that the aerosol generating device 1 may further include other generally used components in addition to the ones shown in FIGS. 2 to 4.

In addition, although it is shown that the heater 13 is included in the aerosol generating device 1 in FIGS. 3 and 4, the heater 13 may be omitted as needed.

FIG. 2 illustrates a linear alignment of the sensing unit 10, the battery 11, the controller 12, and the heater 13. In addition, FIG. 3 illustrates a linear alignment of the battery 11, the controller 12, the vaporizer 14, and the heater 13. Further, FIG. 4 illustrates a parallel alignment of the vaporizer 14 and the heater 13. However, the internal structure of the aerosol generating device 1 is not limited to what is shown in FIGS. 2 to 4. That is, such alignments of the sensing unit 10, the battery 11, the controller 12, the heater 13, and the vaporizer 14 may be changed depending on the design of the aerosol generating device 1.

When the cigarette 2 is inserted into the aerosol generating device 1, the aerosol generating device 1 may actuate the heater 13 and/or the vaporizer 14 to generate an aerosol. The aerosol generated by the heater 13 and/or the vaporizer 14 may pass through the cigarette 2 into the user.

Even when the cigarette 2 is not inserted in the aerosol generating device 1, the aerosol generating device 1 may heat the heater 13, as needed.

The battery 11 may supply power to be used to operate the aerosol generating device 1. For example, the battery 11 may supply power to heat the heater 13 or the vaporizer 14, and may supply power required for the controller 12 to operate. In addition, the battery 11 may supply power required to operate a display, a sensor, a motor, or the like installed in the aerosol generating device 1.

The controller 12 may control the overall operation of the aerosol generating device 1. For example, the controller 12 may control respective operations of other components included in the aerosol generating device 1, in addition to the sensing unit 10, the battery 11, the heater 13, and the vaporizer 14. In addition, the controller 12 may verify a state of each of the components of the aerosol generating device 1 to determine whether the aerosol generating device 1 is in an operable state.

The controller 12 may include at least one processor. The at least one processor may be implemented as an array of a plurality of logic gates, or may be implemented as a combination of a general-purpose microprocessor and a memory in which a program executable by the microprocessor is stored. In addition, it is to be understood by those having ordinary skill in the art to which the disclosure pertains that the at least one processor may be implemented in other types of hardware.

The heater 13 may be heated by the power supplied by the battery 11. For example, when the cigarette is inserted in the aerosol generating device 1, the heater 13 may be disposed outside the cigarette. The heated heater 13 may thus raise the temperature of an aerosol generating material in the cigarette.

The heater 13 may be an electrically resistive heater. In this example, the heater 13 may include an electrically conductive track, and the heater 13 may be heated as a current flows through the electrically conductive track. However, the heater 13 is not limited to the foregoing example, and any example of heating the heater 13 up to a desired temperature may be applicable without limitation. The desired temperature may be preset in the aerosol generating device 1 or may be set by the user.

For another example, the heater 13 may be an induction heater. Specifically, the heater 13 may include an electrically conductive coil for heating the cigarette in an induction heating manner, and the cigarette may include a susceptor to be heated by the induction heater.

For example, the heater 13 may include a tubular heating element, a plate-shaped heating element, a needle-shaped heating element, or a rod-shaped heating element, and may heat the inside or outside of the cigarette 2 according to the shape of a heating element.

In addition, the heater 13 may be provided as a plurality of heaters in the aerosol generating device 1. In this case, the heaters 13 may be disposed to be inserted into the cigarette 2, or may be disposed outside the cigarette 2. In addition, some of the heaters 13 may be disposed to be inserted into the cigarette 2, and the rest may be disposed outside the cigarette 2. However, the shape of the heater 13 is not limited to what is shown in FIGS. 2 to 4 but may be provided in various shapes.

The vaporizer 14 may heat a liquid composition to generate an aerosol, and the generated aerosol may pass through the cigarette 2 into the user. That is, the aerosol generated by the vaporizer 14 may travel along an airflow path of the aerosol generating device 1, and the airflow path may be configured such that the aerosol generated by the vaporizer 14 passes through the cigarette 2 into the user.

For example, the vaporizer 14 may include a liquid storage, a liquid transfer means, and a heating element. However, embodiments are not limited thereto. For example, the liquid storage, the liquid transfer means, and the heating element may be included as independent modules in the aerosol generating device 1.

The liquid storage may store the liquid composition. The liquid composition may be, for example, a liquid including a tobacco-containing material that includes a volatile tobacco flavor component, or may be a liquid including a non-tobacco material. The liquid storage may be manufactured to be detachable and attachable from and to the vaporizer 14, or may be manufactured in an integral form with the vaporizer 14.

The liquid composition may include, for example, water, a solvent, ethanol, a plant extract, a fragrance, a flavoring agent, or a vitamin mixture. The fragrance may include, for example, menthol, peppermint, spearmint oil, various fruit flavors, and the like. However, embodiments are not limited thereto. The flavoring agent may include ingredients that provide the user with a variety of flavors or scents. The vitamin mixture may be a mixture of at least one of vitamin A, vitamin B, vitamin C, and vitamin E. However, embodiments are not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic. However, embodiments are not limited thereto.

The heating element may be an element for heating the liquid composition transferred by the liquid transfer means. The heating element may be, for example, a metal heating wire, a metal heating plate, a ceramic heater, or the like. However, embodiments are not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated.

For example, the vaporizer 14 may also be referred to as a cartomizer or an atomizer. However, embodiments are not limited thereto.

Meanwhile, the aerosol generating device 1 may further include general-purpose components in addition to the sensing unit 10, the battery 11, the controller 12, the heater 13, and the vaporizer 14. For example, the aerosol generating device 1 may include a display that outputs visual information and/or a motor that outputs tactile information.

According to an embodiment, the sensing unit 10 may include one or more biosensors. For example, the biosensors may include one or more of a blood pressure sensor, an electrocardiogram sensor, or a blood oxygen saturation sensor. The biosensors may include sensors configured to measure biosignals of the user, and are not limited to the embodiments described above. When the user grabs the aerosol generating device 1, a biosignal of the user may be measured.

According to an embodiment, the sensing unit 10 may include a sensor configured to measure a body composition of the user. For example, the body composition may include a skeletal muscle mass, a basal metabolic rate, a body water content, and a body fat mass. When the user grabs the aerosol generating device 1, the body composition of the user may be measured.

According to an embodiment, the sensing unit 10 may further include a puff detection sensor, a temperature detection sensor, a cigarette insertion detection sensor. In addition, the aerosol generating device 1 may be manufactured to have a structure in which external air may be introduced or internal gas may flow out even with the cigarette 2 being inserted.

Although not shown in FIGS. 2 to 4, the aerosol generating device 1 may constitute a system along with a separate cradle. For example, the cradle may be used to charge the battery 11 of the aerosol generating device 1. Alternatively, the cradle may be used to heat the heater 13, with the cradle and the aerosol generating device 1 coupled.

The cigarette 2 may be of a similar type to a general burning type. For example, the cigarette 2 may be divided into a first portion including an aerosol generating material and a second portion including a filter or the like. Alternatively, the second portion of the cigarette 2 may also include the aerosol generating material. For example, the aerosol generating material provided in the form of granules or capsules may be inserted into the second portion.

The first portion may be entirely inserted into the aerosol generating device 1, and the second portion may be exposed outside. Alternatively, the first portion may be partially inserted into the aerosol generating device 1, and the first portion may be entirely inserted and the second portion may be partially inserted into the aerosol generating device 1. The user may then inhale an aerosol with the second portion in their mouth. In this case, an aerosol may be generated as external air passes through the first portion, and the generated aerosol may pass through the second portion into the mouth of the user.

For example, the external air may be introduced through at least one air path formed in the aerosol generating device 1. In this example, the opening or closing and/or the size of the air path formed in the aerosol generating device 1 may be adjusted by the user. Accordingly, an amount of atomization, a sense of smoking, or the like may be adjusted by the user. As another example, the external air may be introduced into the inside of the cigarette 2 through at least one hole formed on a surface of the cigarette 2.

Hereinafter, examples of the cigarette 2 will be described with reference to FIGS. 5 and 6.

Figure 5:
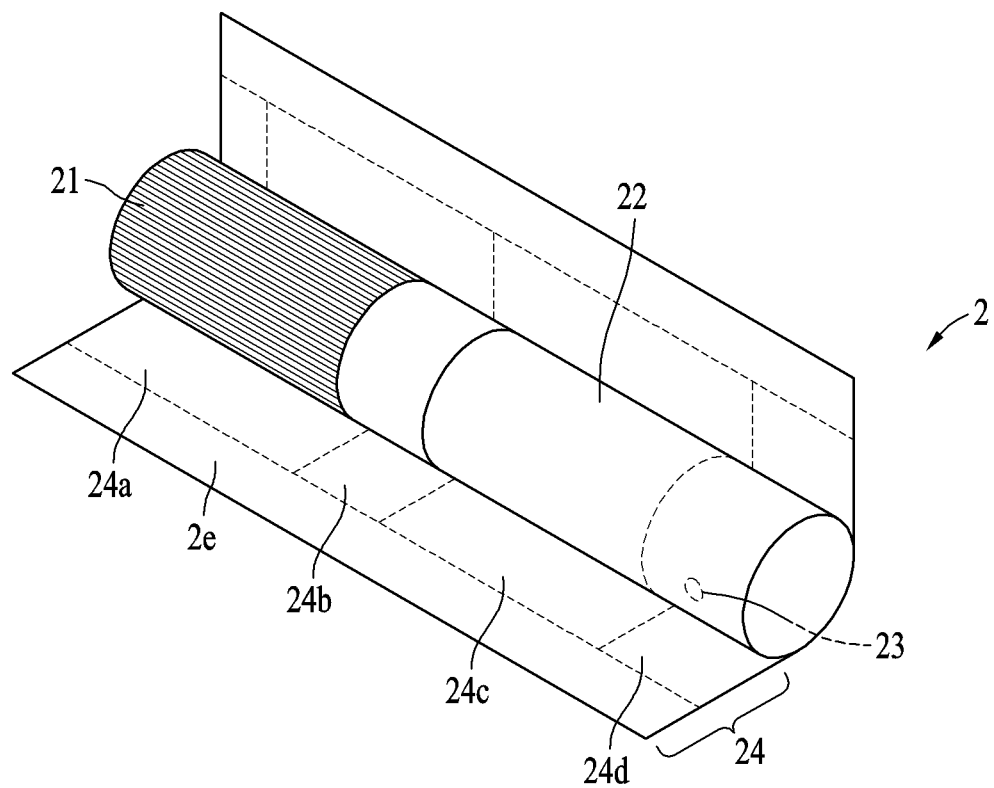
FIGS. 5 and 6 are perspective views of examples of a cigarette according to an example.
Figure 6:
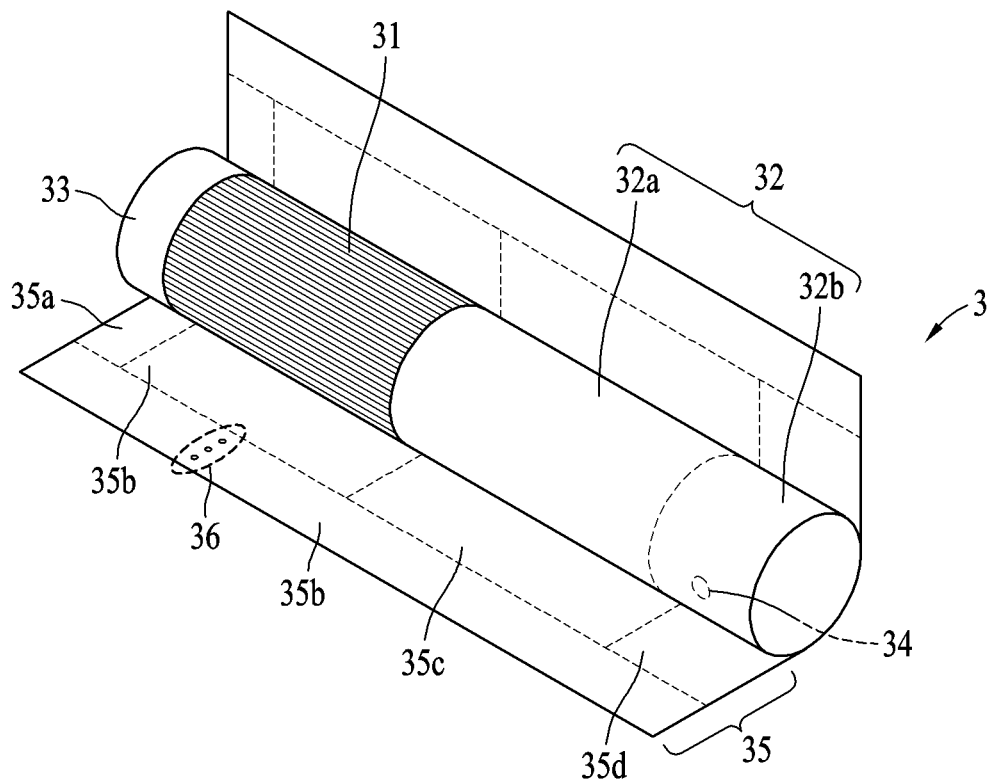

FIGS. 5 and 6 are perspective views of examples of a cigarette according to an example.

Referring to FIG. 5, the cigarette 2 may include a tobacco rod 21 and a filter rod 22. The first portion and the second portion described above with reference to FIGS. 2 to 4 may include the tobacco rod 21 and the filter rod 22, respectively.

Although the filter rod 22 is illustrated as having a single segment in FIG. 5, embodiments are not limited thereto. That is, the filter rod 22 may include a plurality of segments. For example, the filter rod 22 may include a segment that cools an aerosol and a segment that filters out certain components contained in an aerosol. In addition, the filter rod 22 may further include at least one segment that performs another function, as needed.

The diameter of the cigarette 2 may be in a range of 5 millimeters (mm) to 9 mm, and the length thereof may be about 48 mm. However, embodiments are not limited thereto. For example, the length of the tobacco rod 21 may be about 12 mm, the length of a first segment of the filter rod 22 may be about 10 mm, the length of a second segment of the filter rod 22 may be about 14 mm, and the length of a third segment of the filter rod 22 may be about 12 mm. However, embodiments are not limited thereto.

The cigarette 2 may be wrapped with at least one wrapper 24. The wrapper 24 may have at least one hole through which external air is introduced or internal gas is discharged outside. For example, the cigarette 2 may be wrapped with one wrapper 24. As another example, the cigarette 2 may be wrapped with two or more wrappers 24 in an overlapping manner. For example, the tobacco rod 21 may be wrapped with a first wrapper 24a, and the filter rod 22 may be wrapped with wrappers 24b, 24c, and 24d. In addition, the cigarette 2 may be entirely wrapped again with a single wrapper 24e. For example, when the filter rod 22 includes a plurality of segments, the segments may be wrapped with the wrappers 24b, 24c, and 24d, respectively.

The first wrapper 24a and the second wrapper 24b may be formed of general filter wrapping paper. For example, the first wrapper 24a and the second wrapper 24b may be porous wrapping paper or non-porous wrapping paper. In addition, the first wrapper 24a and the second wrapper 24b may be formed of oilproof paper and/or an aluminum laminated wrapping material.

The third wrapper 24c may be formed of hard wrapping paper. For example, the basis weight of the third wrapper 24c may be in a range of 88 grams per square meter ($g/m^2$) to 96 $g/m^2$, and may be desirably in a range of 90 $g/m^2$ to 94 $g/m^2$. In addition, the thickness of the third wrapper 24c may be in a range of 120 micrometers (μm) to 130 μm, and may be desirably 125 μm.

The fourth wrapper 24d may be formed of oilproof hard wrapping paper. For example, the basis weight of the fourth wrapper 24d may be in a range of 88 $g/m^2$ to 96 $g/m^2$, and may be desirably in a range of 90 $g/m^2$ to 94 $g/m^2$. In addition, the thickness of the fourth wrapper 24d may be in a range of 120 μm to 130 μm, and may be desirably 125 μm.

The fifth wrapper 24e may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 24e may be in a range of 57 $g/m^2$ to 63 $g/m^2$, and may be desirably 60 $g/m^2$. In addition, the thickness of the fifth wrapper 24e may be in a range of 64 μm to 70 μm, and may be desirably 67 μm.

The fifth wrapper 24e may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) to the fifth wrapper 24e without limitation.

The fifth wrapper 24e may prevent the cigarette 2 from burning. For example, there may be a probability that the cigarette 2 burns when the tobacco rod 21 is heated by the heater 13. For example, when the temperature rises above an ignition point of any one of materials included in the tobacco rod 21, the cigarette 2 may burn. Even in this case, it may still be possible to prevent the cigarette 2 from burning because the fifth wrapper 24e includes a non-combustible material.

In addition, the fifth wrapper 24e may prevent a holder from being contaminated by substances produced in the cigarette 2. For example, liquid substances may be produced in the cigarette 2 by puffs from the user. For example, as an aerosol generated in the cigarette 2 is cooled by external air, such liquid substances (e.g., water, etc.) may be produced. Thus, wrapping the cigarette 2 with the fifth wrapper 24e may prevent the liquid substances produced in the cigarette 2 from leaking out of the cigarette 2.

The tobacco rod 21 may include an aerosol generating material. The aerosol generating material may include, for example, at least one of glycerin, propylene glycol, ethylene glycol, dipropylene glycol, diethylene glycol, triethylene glycol, tetraethylene glycol, and oleyl alcohol. However, embodiments are not limited thereto. The tobacco rod 21 may also include other additives, such as, for example, a flavoring agent, a wetting agent, and/or an organic acid. In addition, the tobacco rod 21 may include a flavoring liquid such as menthol or a moisturizing agent that is added as being sprayed onto the tobacco rod 21.

The tobacco rod 21 may be manufactured in various forms. For example, the tobacco rod 21 may be manufactured as a sheet or as a strand. The tobacco rod 21 may also be formed with a cut tobacco filler from finely cut tobacco sheets. In addition, the tobacco rod 21 may be enveloped by a heat-conductive material. The heat-conductive material may be, for example, a metal foil such as an aluminum foil. However, embodiments are not limited thereto. For example, the heat-conductive material enveloping the tobacco rod 21 may evenly distribute the heat transferred to the tobacco rod 21 to improve the thermal conductivity to be applied to the tobacco rod 21, thereby improving the taste of tobacco. In addition, the thermally conductive material enveloping the tobacco rod 21 may function as a susceptor heated by an induction heater. In this case, although not shown, the tobacco rod 21 may further include an additional susceptor in addition to the thermally conductive material enveloping the outside thereof.

The filter rod 22 may be a cellulose acetate filter. However, there is no limit to the shape of the filter rod 22. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

A first segment of the filter rod 22 may be a cellulose acetate filter. For example, the first segment may be a tubular structure including a hollow therein. The first segment may prevent internal materials of the tobacco rod 21 from being pushed back when the heater 13 is inserted and generate an aerosol cooling effect. A desirable diameter of the hollow included in the first segment may be adopted from a range of 2 mm to 4.5 mm. However, embodiments are not limited thereto.

A desirable length of the first segment may be adopted from a range of 4 mm to 30 mm. However, embodiments are not limited thereto. The length of the first segment may be desirably 10 mm. However, embodiments are not limited thereto.

The first segment may have a hardness that is adjustable through an adjustment of the content of a plasticizer in a process of manufacturing the first segment. In addition, the first segment may be manufactured by inserting a structure such as a film or a tube of the same or different materials inside (e.g., the hollow).

A second segment of the filter rod 22 may cool an aerosol generated as the heater 13 heats the tobacco rod 21. The user may thus inhale the aerosol cooled down to a suitable temperature.

The length or diameter of the second segment may be determined in various ways according to the shape of the cigarette 2. For example, a desirable length of the second segment may be adopted from a range of 7 mm to 20 mm. The length of the second segment may be desirably about 14 mm. However, embodiments are not limited thereto.

The second segment may be manufactured by weaving a polymer fiber. In this case, a flavoring liquid may be applied to fiber formed of a polymer. Alternatively, the second segment may be manufactured by weaving a separate fiber to which a flavoring liquid is applied and the fiber formed of the polymer together. Alternatively, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA,) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

For example, the second segment formed with the crimped polymer sheet may be formed of a material having a thickness between about 5 μm and about 300 μm, for example, between about 10 μm and about 250 μm. In addition, the total surface area of the second segment may be between about 300 square millimeters per millimeter ($mm^2$/mm) and about 1000 $mm^2$/mm. Further, an aerosol cooling element may be formed from a material having a specific surface area between about 10 square millimeters per milligram ($mm^2$/mg) and about 100 $mm^2$/mg.

Meanwhile, the second segment may include a thread containing a volatile flavor ingredient. The volatile flavor ingredient may be menthol. However, embodiments are not limited thereto. For example, the thread may be filled with a sufficient amount of menthol to provide at least 1.5 milligrams (mg) of menthol to the second segment.

A third segment of the filter rod 22 may be a cellulose acetate filter. A desirable length of the third segment may be adopted from a range of 4 mm to 20 mm. For example, the length of the third segment may be about 12 mm. However, embodiments are not limited thereto.

The third segment may be manufactured such that a flavor is generated by spraying a flavoring liquid onto the third segment in a process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the durability of the flavor to be carried to the user may be enhanced.

In addition, the filter rod 22 may include at least one capsule 23. The capsule 23 may perform a function of generating a flavor, or a function of generating an aerosol. For example, the capsule 23 may be of a structure in which a liquid containing a fragrance is wrapped with a film. The capsule 23 may have a spherical or cylindrical shape. However, embodiments are not limited thereto.

Referring to FIG. 6, a cigarette 3 may further include a front end plug 33. The front end plug 33 may be disposed on one side of a tobacco rod 31 opposite to a filter rod 32. The front end plug 33 may prevent the tobacco rod 31 from escaping to the outside, and may also prevent the aerosol liquefied from the tobacco rod 31 during smoking from flowing into an aerosol generating device (e.g., the aerosol generating device 1 of FIGS. 2 to 4).

The filter rod 32 may include a first segment 32a and a second segment 32b. The first segment 32a may correspond to the first segment of the filter rod 22 of FIG. 5, and the second segment 32b may correspond to the third segment of the filter rod 22 of FIG. 5.

The diameter and the total length of the cigarette 3 may correspond to the diameter and the total length of the cigarette 2 of FIG. 5. For example, the length of the front end plug 33 may be about 7 mm, the length of the tobacco rod 31 may be about 15 mm, the length of the first segment 32a may be about 12 mm, and the length of the second segment 32b may be about 14 mm. However, embodiments are not limited thereto.

The cigarette 3 may be wrapped with at least one wrapper 35. The wrapper 35 may have at least one hole through which external air flows inside or internal gas flows outside. For example, the front end plug 33 may be wrapped with a first wrapper 35a, the tobacco rod 31 may be wrapped with a second wrapper 35b, the first segment 32a may be wrapped with a third wrapper 35c, and the second segment 32b may be wrapped with a fourth wrapper 35d. In addition, the cigarette 3 may be entirely wrapped again with a fifth wrapper 35e.

In addition, at least one perforation 36 may be formed on the fifth wrapper 35e. For example, the perforation 36 may be formed in an area surrounding the tobacco rod 31. However, embodiments are not limited thereto. The perforation 36 may perform a function of transferring heat generated by the heater 13 shown in FIGS. 3 and 4 to the inside of the tobacco rod 31.

In addition, the second segment 32b may include at least one capsule 34. The capsule 34 may perform a function of generating a flavor or a function of generating an aerosol. For example, the capsule 34 may have a structure in which a liquid containing a fragrance is wrapped with a film. The capsule 34 may have a spherical or cylindrical shape. However, embodiments are not limited thereto.

The first wrapper 35a may be a combination of general filter wrapping paper and a metal foil such as an aluminum foil. For example, the total thickness of the first wrapper 35a may be in a range of 45 µm to 55 µm, and may be desirably 50.3 µm. In addition, the thickness of the metal foil of the first wrapper 35a may be in a range of 6 µm to 7 µm, and may be desirably 6.3 µm. In addition, the basis weight of the first wrapper 35a may be in a range of 50 g/m² to 55 g/m², and may be desirably 53 g/m².

The second wrapper 35b and the third wrapper 35c may be formed with general filter wrapping paper. The second wrapper 35b and the third wrapper 35c may each be, for example, porous wrapping paper or non-porous wrapping paper.

For example, the porosity of the second wrapper 35b may be 35000 CU. However, embodiments are not limited thereto. In addition, the thickness of the second wrapper 35b may be in a range of 70 µm to 80 µm, and may be desirably 78 µm. In addition, the basis weight of the second wrapper 35b may be in a range of 20 g/m² to 25 g/m², and may be desirably 23.5 g/m².

For example, the porosity of the third wrapper 35c may be 24000 CU. However, embodiments are not limited thereto. In addition, the thickness of the third wrapper 35c may be in a range of 60 µm to 70 µm, and may be desirably 68 µm. In addition, the basis weight of the third wrapper 35c may be in a range of 20 g/m² to 25 g/m², and may be desirably 21 g/m².

The fourth wrapper 35d may be formed with polylactic acid (PLA) laminated paper. The PLA laminated paper may refer to three-ply paper including a paper layer, a PLA layer, and a paper layer. For example, the thickness of the fourth wrapper 35d may be in a range of 100 µm to 120 µm, and may be desirably 110 µm. In addition, the basis weight of the fourth wrapper 35d may be in a range of 80 g/m² to 100 g/m², and may be desirably 88 g/m².

The fifth wrapper 35e may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 35e may be in a range of 57 g/m² to 63 g/m², and may be desirably 60 g/m². In addition, the thickness of the fifth wrapper 35e may be in a range of 64 µm to 70 µm, and may be desirably 67 µm.

The fifth wrapper 35e may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) to the fifth wrapper 35e without limitation.

The front end plug 33 may be formed of cellulose acetate. For example, the front end plug 33 may be manufactured by adding a plasticizer (e.g., triacetin) to cellulose acetate tow. The mono denier of a filament constituting the cellulose acetate tow may be in a range of 1.0 to 10.0, and may be desirably in a range of 4.0 to 6.0. The mono denier of the filament of the front end plug 33 may be more desirably 5.0. In addition, a cross section of the filament constituting the front end plug 33 may be Y-shaped. The total denier of the front end plug 33 may be in a range of 20000 to 30000, and may be desirably in a range of 25000 to 30000. The total denier of the front end plug 33 may be more desirably 28000.

In addition, as needed, the front end plug 33 may include at least one channel, and a cross-sectional shape of the channel may be provided in various ways.

The tobacco rod 31 may correspond to the tobacco rod 21 described above with reference to FIG. 5. Thus, a detailed description of the tobacco rod 31 will be omitted here.

The first segment 32a may be formed of cellulose acetate. For example, the first segment may be a tubular structure including a hollow therein. The first segment 32a may be manufactured by adding a plasticizer (e.g., triacetin) to cellulose acetate tow. For example, the mono denier and the total denier of the first segment 32a may be the same as the mono denier and the total denier of the front end plug 33.

The second segment 32b may be formed of cellulose acetate. The mono denier of a filament constituting the second segment 32b may be in a range of 1.0 to 10.0, and may be desirably in a range of 8.0 to 10.0. The mono denier of the filament of the second segment 32b may be more desirably 9.0. In addition, a cross section of the filament of the second segment 32b may be Y-shaped. The total denier of the second segment 32b may be in a range of 20000 to 30000, and may be desirably 25000.

Figure 7:
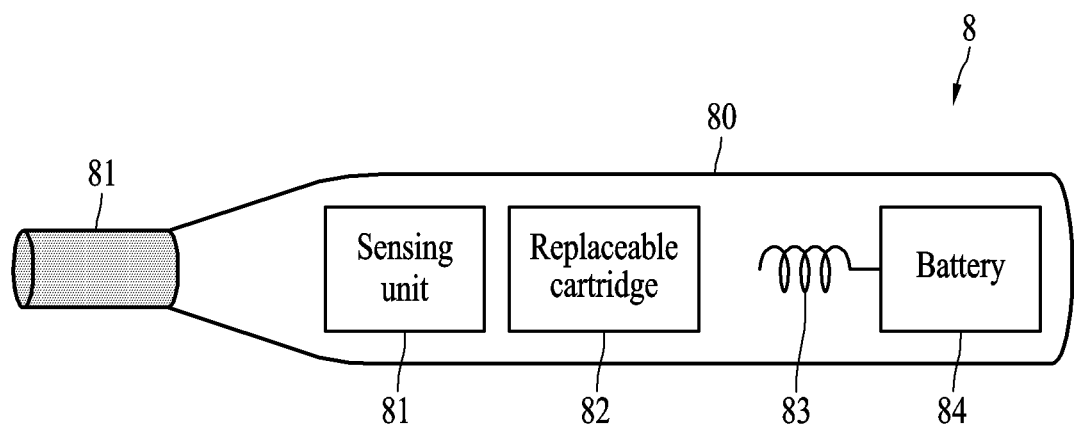
FIG. 7 is a block diagram illustrating an aerosol generating device according to another example.

FIG. 7 is a block diagram illustrating an aerosol generating device according to another example.

According to an embodiment, an aerosol generating device 8 may include a housing 80, a sensing unit 81, a replaceable cartridge (or liquid-type cartridge) 82, a coil 83, and a battery 84. The aerosol generating device 8 may operate in a different manner from that of the aerosol generating device 1 described above with reference to FIGS. 2 to 6. For example, the coil 83 may generate heat by receiving energy from the battery 84. The replaceable cartridge 82 may generate an aerosol using the heat generated by the coil 83. A user may inhale the generated aerosol through an opening 81.

According to an embodiment, the description of the sensing unit 81 may be replaced with the description of the sensing unit 10 provided above with reference to FIGS. 2 to 4.

Figure 8:
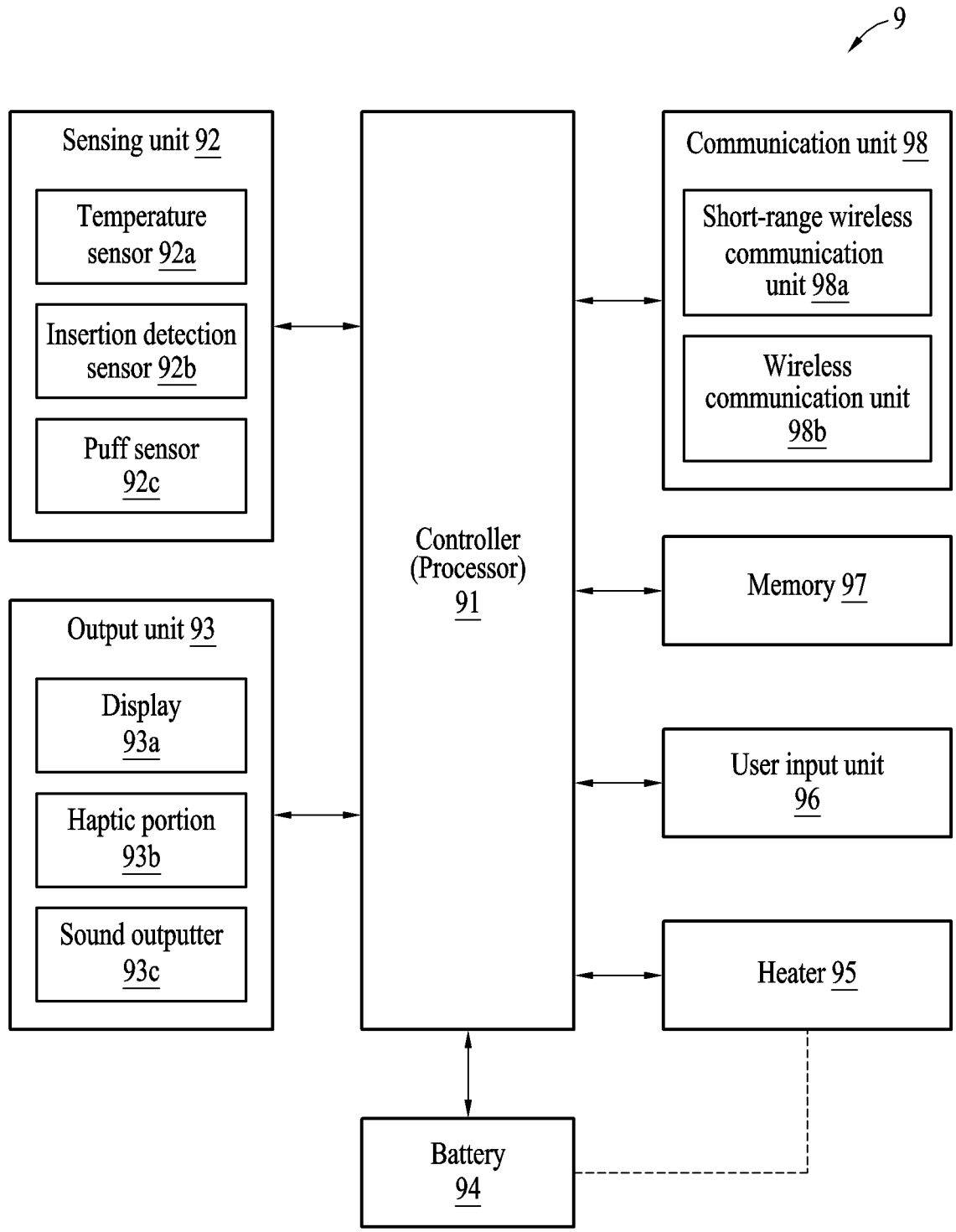
FIG. 8 is a block diagram illustrating an aerosol generating device according to still another example.

FIG. 8 is a block diagram illustrating an aerosol generating device according to still another example.

According to an embodiment, an aerosol generating device 9 may include a controller 91, a sensing unit 92, an output unit 93, a battery 94, a heater 95, a user input unit 96, a memory 97, and a communication unit 98. However, the internal structure of the aerosol generating device 9 is not limited to what is shown in FIG. 8. It is to be understood by those having ordinary skill in the art to which the disclosure pertains that some of the components shown in FIG. 8 may be omitted or new components may be added according to the design of the aerosol generating device 9.

The sensing unit 92 may sense a state of the aerosol generating device 9 or a state of an environment around the aerosol generating device 9, and transmit sensing information obtained through the sensing to the controller 91. Based on the sensing information, the controller 91 may control the aerosol generating device 9 to control operations of the heater 95, restrict smoking, determine whether an aerosol generating article (e.g., a cigarette, a cartridge, etc.) is inserted, display a notification, and perform other functions.

The sensing unit 92 may include at least one of a temperature sensor 92a, an insertion detection sensor 92b, and a puff sensor 92c. However, embodiments are not limited thereto. For example, the sensing unit 92 may include the sensors of the sensing unit 10 or the sensing unit 81 described above with reference to FIGS. 2 to 8.

The temperature sensor 92a may sense a temperature at which the heater 95 (or an aerosol generating material) is heated. The aerosol generating device 9 may include a separate temperature sensor for sensing a temperature of the heater 95, or the heater 95 itself may perform a function as a temperature sensor. Alternatively, the temperature sensor 92a may be arranged around the battery 94 to monitor a temperature of the battery 94.

The insertion detection sensor 92b may sense whether the aerosol generating article is inserted or removed. The insertion detection sensor 92b may include, for example, at least one of a film sensor, a pressure sensor, a light sensor, a resistive sensor, a capacitive sensor, an inductive sensor, and an infrared sensor, which may sense a signal change by the insertion or removal of the aerosol generating article.

The puff sensor 92c may sense a puff from a user based on various physical changes in an airflow path or airflow channel. For example, the puff sensor 92c may sense the puff based on any one of a temperature change, a flow change, a voltage change, and a pressure change.

The sensing unit 92 may further include at least one of a temperature/humidity sensor, a barometric pressure sensor, a magnetic sensor, an acceleration sensor, a gyroscope sensor, a position sensor (e.g., a global positioning system (GPS)), a proximity sensor, and a red, green, blue (RGB) sensor (e.g., an illuminance sensor), in addition to the sensors 92a through 92c described above. A function of each sensor may be intuitively inferable from its name by those having ordinary skill in the art, and thus a more detailed description thereof will be omitted here.

The output unit 93 may output information about the state of the aerosol generating device 9 and provide the information to the user. The output unit 93 may include at least one of a display 93a, a haptic portion 93b, and a sound outputter 93c. However, embodiments are not limited thereto. When the display 93a and a touchpad are provided in a layered structure to form a touchscreen, the display 93a may be used as an input device in addition to an output device.

The display 93a may visually provide the information about the aerosol generating device 9 to the user. The information about the aerosol generating device 9 may include, for example, a charging/discharging state of the battery 94 of the aerosol generating device 9, a preheating state of the heater 95, an insertion/removal state of the aerosol generating article, a limited usage state (e.g., an abnormal article detected) of the aerosol generating device 9, or the like, and the display 93a may externally output the information. The display 93a may be, for example, a liquid-crystal display panel (LCD), an organic light-emitting display panel (OLED), or the like. The display 93a may also be in the form of a light-emitting diode (LED) device.

The haptic portion 93b may provide the information about the aerosol generating device 9 to the user in a haptic way by converting an electrical signal into a mechanical stimulus or an electrical stimulus. The haptic portion 93b may include, for example, a motor, a piezoelectric element, or an electrical stimulation device.

The sound outputter 93c may provide the information about the aerosol generating device 9 to the user in an auditory way. For example, the sound outputter 93c may convert an electrical signal into a sound signal and externally output the sound signal.

The battery 94 may supply power to be used to operate the aerosol generating device 9. The battery 94 may supply power to heat the heater 95. In addition, the battery 94 may supply power required for operations of the other components (e.g., the sensing unit 92, the output unit 93, the user input unit 96, the memory 97, and the communication unit 98) included in the aerosol generating device 9. The battery 94 may be a rechargeable battery or a disposable battery. The battery 94 may be, for example, a lithium polymer (LiPoly) battery. However, embodiments are not limited thereto.

The heater 95 may receive power from the battery 94 to heat the aerosol generating material. Although not shown in FIG. 8, the aerosol generating device 9 may further include a power conversion circuit (e.g., a direct current (DC)-to-DC (DC/DC) converter) that converts power of the battery 94 and supplies the power to the heater 95. In addition, when the aerosol generating device 9 generates an aerosol in an induction heating manner, the aerosol generating device 9 may further include a DC-to-alternating current (AC) (DC/AC) converter that converts DC power of the battery 94 into AC power.

The controller 91, the sensing unit 92, the output unit 93, the user input unit 96, the memory 97, and the communication unit 98 may receive power from the battery 94 to perform functions. Although not shown in FIG. 8, a power conversion circuit, for example, a low dropout (LDO) circuit or a voltage regulator circuit, which converts power of the battery 94 and supplies the power to respective components, may further be included.

In an embodiment, the heater 95 may be formed of an electrically resistive material that is suitable. The electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 95 may be implemented as a metal heating wire, a metal heating plate on which an electrically conductive track is arranged, a ceramic heating element, or the like. However, embodiments are not limited thereto.

In another embodiment, the heater 95 may be an induction heater. For example, the heater 95 may include a susceptor that heats the aerosol generating material by generating heat through a magnetic field applied by a coil.

In an embodiment, the heater 95 may include a plurality of heaters. For example, the heater 95 may include a first heater for heating a cigarette and a second heater for heating a liquid.

The user input unit 96 may receive information input from the user or may output information to the user. For example, the user input unit 96 may include a keypad, a dome switch, a touchpad (e.g., a contact capacitive type, a pressure resistive film type, an infrared sensing type, a surface ultrasonic conduction type, an integral tension measurement type, a piezo effect method, etc.) a jog wheel, a jog switch, or the like. However, embodiments are not limited thereto. In addition, although not shown in FIG. 8, the aerosol generating device 9 may further include a connection interface such as a USB interface, and may be connected to another external device through the connection interface such as a USB interface to transmit and receive information or to charge the battery 94.

The memory 97, which is hardware for storing various pieces of data processed in the aerosol generating device 9, may store data processed by the controller 91 and data to be processed thereby. The memory 97 may include at least one type of storage medium of a flash memory type memory, a hard disk type memory, a multimedia card micro type memory, a card type memory (e.g., an SD or XE memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 97 may store an operating time of the aerosol generating device 9, a maximum number of puffs, a current number of puffs, at least one temperature profile, data associated with a smoking pattern of the user, or the like.

The communication unit 98 may include at least one component for communicating with another electronic device. For example, the communication unit 98 may include a short-range wireless communication unit 98a and a wireless communication unit 98b.

The short-range wireless communication unit 98a may include a Bluetooth communication unit, a BLE communication unit, a near field communication unit, a WLAN (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 98b may include, for example, a cellular network communication unit, an Internet communication unit, a computer network (e.g., a local area network (LAN) or a wide-area network (WAN)) communication unit, or the like. However, embodiments are not limited thereto. The wireless communication unit 98b may use subscriber information (e.g., international mobile subscriber identity (IMSI)) to identify and authenticate the aerosol generating device 9 in a communication network.

The controller 91 may control the overall operation of the aerosol generating device 9. In an embodiment, the controller 91 may include at least one processor. The at least one processor may be implemented as an array of a plurality of logic gates, or may be implemented as a combination of a general-purpose microprocessor and a memory in which a program executable by the microprocessor is stored. In addition, it is to be understood by those having ordinary skill in the art to which the present disclosure pertains that it may be implemented in other types of hardware.

The controller 91 may control the temperature of the heater 95 by controlling the supply of power from the battery 94 to the heater 95. For example, the controller 91 may control the supply of power by controlling switching of a switch element between the battery 94 and the heater 95. For another example, a direct heating circuit may control the supply of power to the heater 95 according to a control command from the controller 91.

The controller 91 may analyze a sensing result obtained by the sensing of the sensing unit 92 and control processes to be performed thereafter. For example, the controller 91 may control power to be supplied to the heater 95 to start or end an operation of the heater 95 based on the sensing result obtained by the sensing unit 92. For another example, the controller 91 may control an amount of power to be supplied to the heater 95 and a time for which the power is to be supplied, such that the heater 95 may be heated up to a predetermined temperature or maintained at a desired temperature, based on the sensing result of the sensing unit 92.

The controller 91 may control the output unit 93 based on the sensing result of the sensing unit 92. For example, when the number of puffs counted through the puff sensor 92c reaches a preset number, the controller 91 may inform the user that the aerosol generating device 9 is to be ended soon, through at least one of the display 93a, the haptic portion 93b, and the sound outputter 93c.

In an embodiment, the controller 91 may control a power supply time and/or a power supply amount for the heater 95 according to a state of the aerosol generating article sensed by the sensing unit 92. For example, when an aerosol generating material is in an over-humidified state, the controller 91 may control the power supply time for an inductive coil to increase a preheating time, compared to a case where the aerosol generating material is in a general state.

Figure 9:
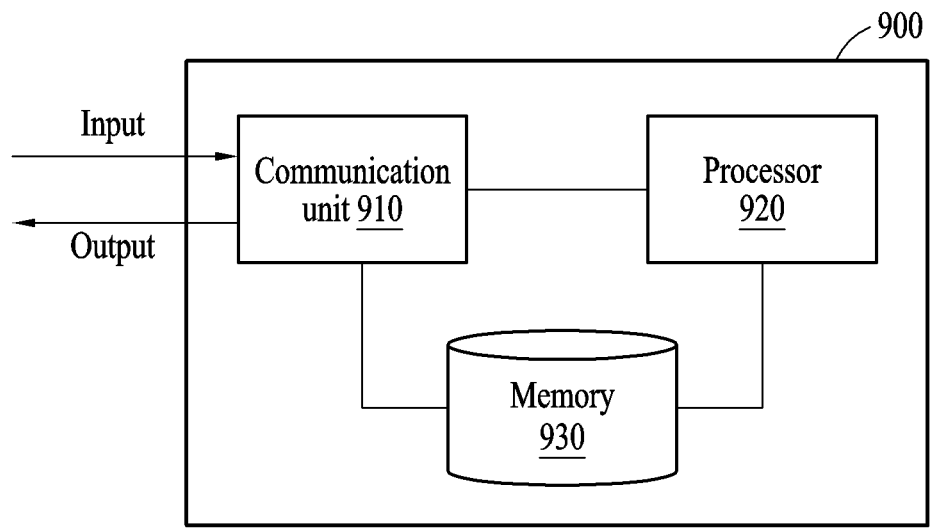
FIG. 9 is a diagram illustrating a configuration of a user terminal according to an embodiment.

FIG. 9 is a diagram illustrating a configuration of a user terminal according to an embodiment.

A user terminal 900 includes a communication unit 910, a processor 920, and a memory 930. For example, the electronic device 900 may be the user terminal 110 described above with reference to FIG. 1.

The communication unit 910 may be connected to the processor 920 and the memory 930 and transmit and receive data to and from the processor 920 and the memory 930. The communication unit 910 may be connected to another external device and transmit and receive data to and from the external device. Hereinafter, transmitting and receiving "A" may refer to transmitting and receiving "information or data indicating A".

The communication unit 910 may be implemented as a circuitry in the user terminal 900. For example, the communication unit 910 may include an internal bus and an external bus. As another example, the communication unit 910 may be an element configured to connect the user terminal 900 to an external device. The communication unit 910 may be an interface. The communication unit 910 may receive data from the external device and transmit the data to the processor 920 and the memory 930.

The processor 920 may process the data received by the communication unit 910 and data stored in the memory 930. A "processor" may be a hardware-implemented data processing device having a physically structured circuit to execute desired operations. The desired operations may include, for example, codes or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 920 may execute computer-readable code (e.g., software) stored in a memory (e.g., the memory 930) and instructions triggered by the processor 920.

The memory 930 may store therein the data received by the communication unit 910 and the data processed by the processor 920. For example, the memory 930 may store the program (or an application, or software). The program to be stored may be a set of syntaxes that are coded and executable by the processor 920 to manage smoking information of a user.

According to one aspect, the memory 930 may include, for example, at least one volatile memory, nonvolatile memory, random-access memory (RAM), flash memory, a hard disk drive, and an optical disc drive.

The memory 930 may store an instruction set (e.g., software) for operating the user terminal 900. The instruction set for operating the user terminal 900 may be executed by the processor 920.

The communication unit 910, the processor 920, and the memory 930 will be described in detail below with reference to FIGS. 10 to 12.

Figure 10:
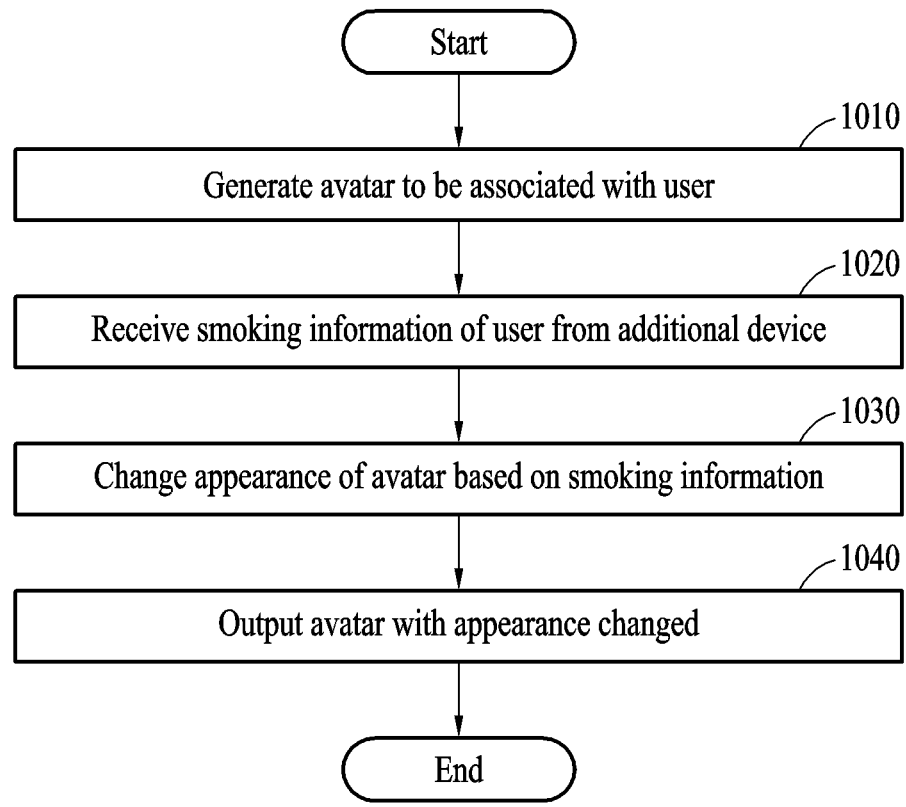
FIG. 10 is a flowchart illustrating a method of managing smoking information according to an embodiment.

FIG. 10 is a flowchart illustrating a method of managing smoking information according to an embodiment.

Operations 1010 through 1040 described below may be performed by the user terminal 900 described above with reference to FIG. 9. Before operation 1010 is performed, the user terminal 900 may be connected to an additional device (e.g., an aerosol generating device) using short-range wireless communication. The additional device may be the aerosol generating device 120 of FIG. 1, the aerosol generating device 1 of FIGS. 2 to 4, the aerosol generating device 8 of FIG. 7, or the aerosol generating device 9 of FIG. 8.

In operation 1010, the user terminal 900 may generate an avatar to be associated with a user. For example, the avatar may be a computer graphical object disposed in a virtual space. The avatar may be a two-dimensional (2D) or three-dimensional (3D) modeled character.

According to an embodiment, the user terminal 900 may author an avatar to correspond to user information using an authoring tool. For example, the authoring tool may use prestored libraries and templates to generate an avatar of a user. A method of generating an avatar based on user information will be described in detail below with reference to FIG. 11.

In operation 1020, the user terminal 900 may receive smoking information of the user from an additional device. For example, the smoking information may include an amount of smoking sensed by the additional device.

According to an embodiment, the user terminal 900 may further receive information about a current condition of the user together with the amount of smoking. For example, the smoking information may further include at least one of a blood pressure, an electrocardiogram, and a blood oxygen saturation, of the user, sensed by the additional device. As another example, the smoking information may include at least one of a skeletal muscle mass, a basal metabolic rate, a body water content, and a body fat mass, of the user, sensed by the additional device.

In operation 1030, the user terminal 900 may change an appearance of the avatar based on the received smoking information. For example, the user terminal 900 may change a basic appearance of the avatar to correspond to specific information among the smoking information.

According to an embodiment, based on the current skeletal muscle mass, basal metabolic rate, body water content, or body fat mass of the user, the appearance of the avatar may be changed to a muscular appearance or a fat appearance.

According to an embodiment, when the current blood pressure of the user is higher than a preset threshold blood pressure or higher than a previously measured blood pressure, the face color of the avatar may be changed to red.

According to an embodiment, when the current blood oxygen saturation of the user is lower than a preset threshold blood oxygen saturation or lower than a previously measured blood oxygen saturation, the face color of the avatar may be changed to be pale.

According to an embodiment, when the resistance value of suction in smoking measured by the additional device is higher than a preset resistance value of suction in smoking, the avatar may be changed to a coughing avatar.

According to an embodiment, the user terminal 900 may generate a cumulative record of the smoking of the user based on the received smoking information. For example, the cumulative record may be a change in a specific indicator value over time. The indicator may include one or more of a blood pressure, an electrocardiogram, a blood oxygen saturation, a skeletal muscle mass, a basal metabolic rate, a body water content, a body fat mass, or an amount of smoking.

The user terminal 900 may determine the current condition of the user based on the cumulative record and change the appearance of the avatar to represent the current condition visually. For example, when a target cumulative amount of smoking for a preset period (e.g., one week, one month, or one year) is preset, the user terminal 900 may change the whole (or a partial) color of the avatar based on the current cumulative amount of smoking and the target cumulative amount of smoking. For example, when the user sets a target cumulative amount of smoking to 20 cigarettes per month, the color of the avatar may be changed to be darker as the current cumulative amount of smoking approaches 20 cigarettes. For example, the color of the avatar may be changed in the order of white, light crimson, deep crimson, and red.

According to an embodiment, the user terminal 900 may notify the user of an indicator requiring the attention of the user through the avatar based on the smoking information. For example, when the current electrocardiogram is abnormal, the user terminal 900 may alert the user by changing the avatar to blink or outputting an animation of the avatar in anger.

In operation 1040, the user terminal 900 may output the avatar with the appearance changed through a display of the user terminal 900.

Figure 11:
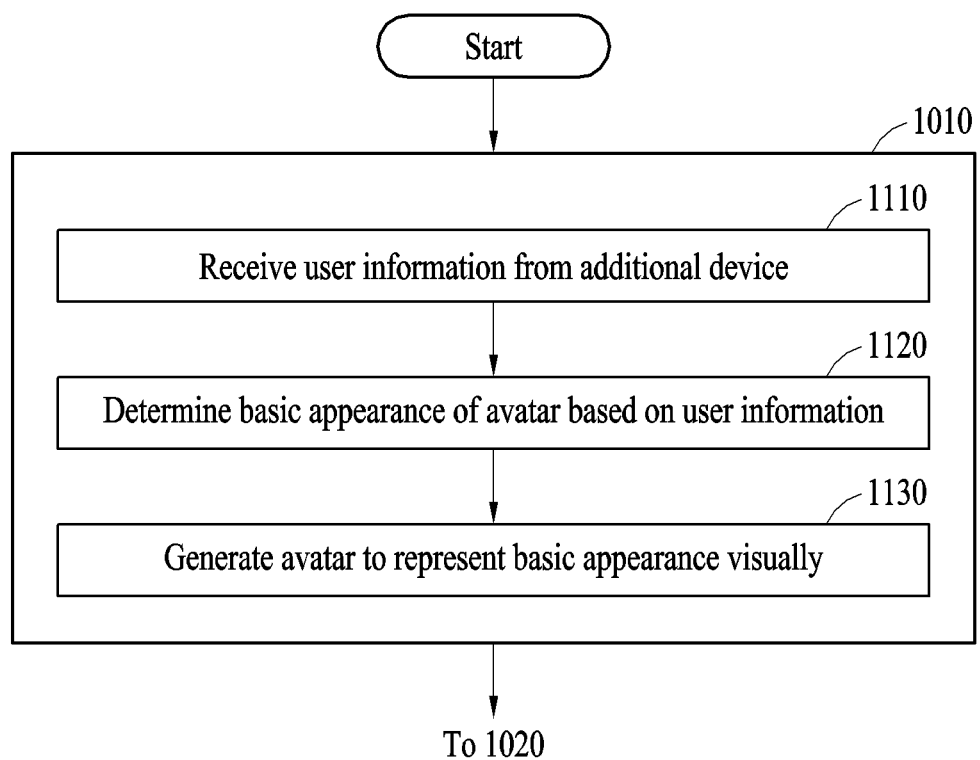
FIG. 11 is a flowchart illustrating a method of generating an avatar according to an example.

FIG. 11 is a flowchart illustrating a method of generating an avatar according to an example.

According to an embodiment, operation 1010 described above with reference to FIG. 10 may include operations 1110 to 1130 to be described hereinafter.

In operation 1110, the user terminal 900 may receive user information from an additional device. The user information may be generated based on sensing information measured by one or more sensors in the additional device. For example, the user information may include at least one of a blood pressure, an electrocardiogram, a blood oxygen saturation, a skeletal muscle mass, a basal metabolic rate, a body water content, and a body fat mass. The user information may be similar to smoking information measured when the user smokes, but the user information may be understood as reference information or initial information of the user measured for initially generating an avatar. That is, the user information may be measured regardless of whether the user smokes or not, and may be desirably measured in a state where the user does not smoke.

According to an embodiment, operation 1110 may be selectively performed. In some embodiments, operation 1110 may not be performed, and operation 1120 may be performed.

According to an embodiment, the user information may include information directly received by the user terminal 900 from the user in addition to the information received from the additional device. For example, the user may input the height, weight, age, and gender of the user into the user terminal 900 through a user interface of the user terminal 900.

In operation 1120, the user terminal 900 may determine a basic appearance of an avatar based on the user information. For example, the level of muscle mass of the user may be determined based on the user information, and the body shape (e.g., a skinny shape, a muscular shape, or an obese shape) of the avatar corresponding to the determined level of muscle mass may be determined. As another example, the color of the face of the avatar may be determined based on a blood pressure and a blood oxygen saturation. As still another example, an action (e.g., an energetic action, a dozing action, or an action of getting angry) of the avatar may be determined based on the user information.

The basic appearance of the avatar is not limited to the embodiments described above, and may include graphical effects or animation effects that the user may visually recognize.

In operation 1130, the user terminal 900 may generate the avatar to represent the basic appearance visually. For example, the generated avatar may be output through the display of the user terminal 900. The user may intuitively recognize his or her health condition through the appearance of the output avatar.

Figure 12:
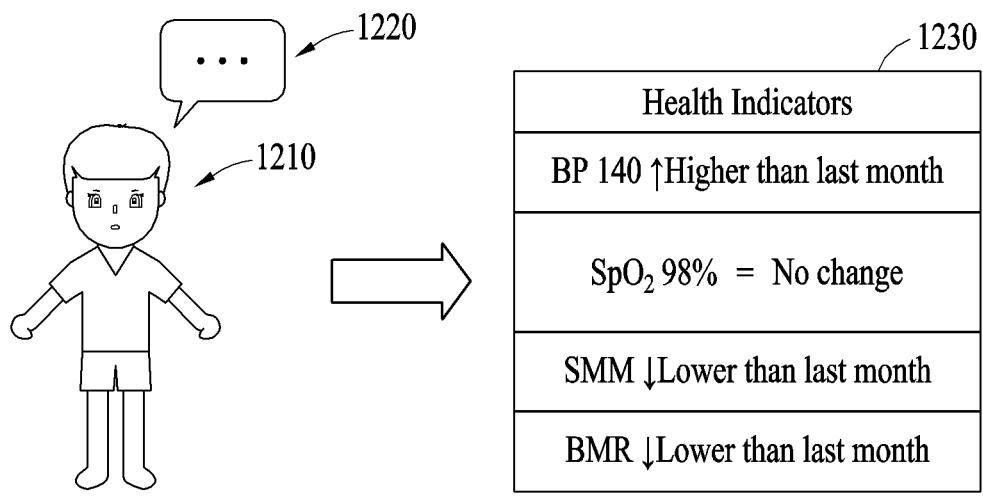
FIG. 12 illustrates indicators related to the health of a user, managed through an avatar, according to an example.

FIG. 12 illustrates indicators related to the health of a user, managed through an avatar, according to an example.

According to an embodiment, an avatar 1210 of a user is shown. The initially generated avatar 1210 may have a basic appearance determined based on user information of the user. When the user smokes using an additional device, the additional device may generate smoking information of the user and transmit the generated smoking information to the user terminal 900.

The user terminal 900 may change the appearance of the avatar 1210 to correspond to the smoking information. For example, based on the current skeletal muscle mass, basal metabolic rate, body water content, or body fat mass of the user, the appearance of the avatar may be changed to a muscular appearance or a fat appearance. As another example, when the current blood pressure of the user is higher than a preset threshold blood pressure or higher than a previously measured blood pressure, the face color of the avatar may be changed to red. As still another example, when the current blood oxygen saturation of the user is lower than a preset threshold blood oxygen saturation or lower than a previously measured blood oxygen saturation, the face color of the avatar may be changed to be pale. As yet another example, when the resistance value of suction in smoking is higher than a preset resistance value of suction in smoking, the avatar may be changed to a coughing avatar.

According to an embodiment, the user terminal 900 may manage a cumulative record of the smoking of the user based on the smoking information. For example, when the user selects (or touches) the avatar 1210 or an additional object 1220, the cumulative record of the smoking may be output. For example, the cumulative record may include a cumulative amount of smoking for a preset period. As another example, the cumulative record may be a table or a change graph for a blood pressure, an electrocardiogram, a blood oxygen saturation, a skeletal muscle mass, a basal metabolic rate, a body water content, or a body fat mass. As another example, the user terminal 900 may determine a health indicator based on the cumulative record, and output changes in the determined health indicator in the form of a table 1230 or a change graph. The health indicator may include a blood pressure, a blood oxygen saturation, a skeletal muscle mass, a basal metabolic rate, and the like, and are not limited to the embodiments described above.

A method for managing smoking information performed by the user terminal 900 receiving information from the additional device has been described with reference to FIGS. 10 to 12, but an embodiment different from the embodiment of FIG. 10 will be described with reference to FIG. 13.

Figure 13:
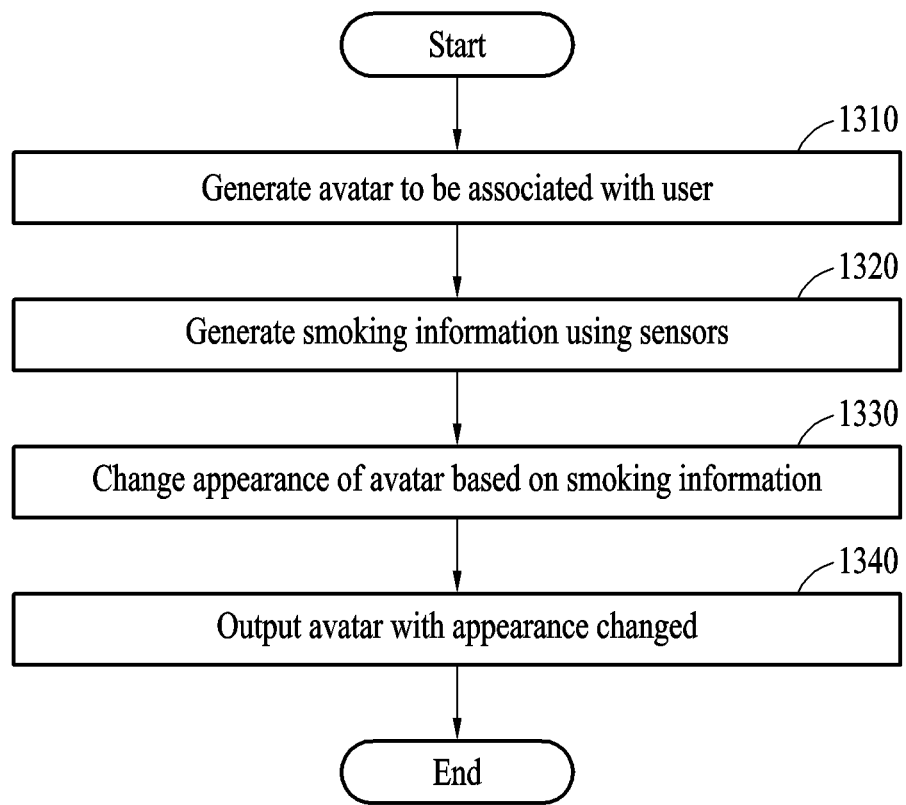
FIG. 13 is a flowchart illustrating a method of managing smoking information according to another embodiment.

FIG. 13 is a flowchart illustrating a method of managing smoking information according to another embodiment.

Operations 1310 to 1340 to be described below may be performed by an electronic device (e.g., the aerosol generating device 120 of FIG. 1, the aerosol generating device 1 of FIGS. 2 to 4, the aerosol generating device 8 of FIG. 7, or the aerosol generating device 9 of FIG. 8).

In operation 1310, the electronic device may generate an avatar to be associated with a user. The description of operation 1010 of FIG. 10 may be similarly applied to the description of operation 1310.

In operation 1320, the electronic device may generate smoking information using one or more sensors in the electronic device. For example, the smoking information may include an amount of smoking sensed by a sensor. As another example, the smoking information may further include at least one of a blood pressure, an electrocardiogram, and a blood oxygen saturation, of the user, sensed by a sensor. As still another example, the smoking information may include at least one of a skeletal muscle mass, a basal metabolic rate, a body water content, and a body fat mass, of the user, sensed by an additional device.

In operation 1330, the electronic device may change an appearance of the avatar based on the smoking information. The description of operation 1030 of FIG. 10 may be similarly applied to the description of operation 1330.

In operation 1340, the electronic device may output the avatar with the appearance changed through a display of the electronic device.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

The invention claimed is:

1. A method of managing smoking information, performed by an electronic device, the method comprising:
   receiving user information of a user from an additional device connected to the electronic device, wherein the user information comprises a biosignal for initial generation of an avatar measured by one or more sensors of the additional device while the user is not smoking;
   determining a basic appearance of the avatar to be associated with the user based on the user information;
   generating the avatar so that the basic appearance is visually displayed;
   receiving smoking information of the user from the additional device, wherein the smoking information is measured by the additional device while the user smokes using the additional device;
   determining whether to change an appearance of the avatar by using a preset threshold value for the smoking information;
   changing an appearance of the avatar to correspond to smoking information when it is determined to change the appearance of the avatar;
   outputting the avatar with the appearance changed; and
   outputting a cumulative record of the smoking information in a state in which the user selects the avatar.

2. The method of claim 1, wherein
the smoking information comprises at least one of a blood pressure, an electrocardiogram, and a blood oxygen saturation sensed by the additional device.

3. The method of claim 1, wherein
the smoking information comprises at least one of a skeletal muscle mass, a basal metabolic rate, a body water content, and a body fat mass sensed by the additional device.

4. The method of claim 1, wherein
the smoking information comprises an amount of smoking sensed by the additional device.

5. A computer-readable storage medium storing a program for executing the method of claim 1.

6. The method of claim 1, wherein
the additional device is an aerosol generating device comprising the one or more sensors.

7. The method of claim 1, wherein
the cumulative record comprises a cumulative amount of smoking for a preset period.

8. The method of claim 1, wherein
the cumulative record comprises a table or a change graph for at least one of a blood pressure, an electrocardiogram, a blood oxygen saturation, a skeletal muscle mass, a basal metabolic rate, a body water content, or a body fat mass.

9. The method of claim 1, further comprising:
   determining a health indicator of the user based on the cumulative record; and
   outputting changes in the health indicator of the user in a form of a table or a change graph from a time between when the user is not smoking using the additional device to after the user smokes using the additional device.

10. The method of claim 9, wherein
the heath indicator comprises at least one of a blood pressure, a blood oxygen saturation, a skeletal muscle mass, or a basal metabolic rate.

11. An electronic device, comprising:
    a memory configured to store a program for managing smoking information; and
    a processor configured to execute the program,
    wherein the processor is configured to:
    receive user information of a user from an additional device connected to the electronic device, wherein the user information comprises a biosignal for initial generation of an avatar measured by one or more sensors of the additional device while the user is not smoking,
    determine a basic appearance of the avatar to be associated with the user based on the user information,
    generate the avatar so that the basic appearance is visually display,
    receive smoking information of the user from the additional device wherein the smoking information is measured by the additional device while the user smokes using the additional device,
    determine whether to change an appearance of the avatar by using a preset threshold value for the smoking information,
    change an appearance of the avatar to correspond to smoking information when it is determined to change the appearance of the avatar,
    output the avatar with the appearance changed; and
    output a cumulative record of the smoking information in a state in which the user selects the avatar.

12. The electronic device of claim 11, wherein
the electronic device is a mobile communication terminal.

13. The electronic device of claim 11, wherein
the additional device is an aerosol generating device comprising the one or more sensors.

14. The method of claim 11, wherein
the cumulative record comprises a cumulative amount of smoking for a preset period.

15. The method of claim 11, wherein
the cumulative record comprises a table or a change graph for at least one of a blood pressure, an electrocardiogram, a blood oxygen saturation, a skeletal muscle mass, a basal metabolic rate, a body water content, or a body fat mass.

16. The method of claim 11, wherein the processor is further configured to:
    determine a health indicator of the user based on the cumulative record; and
    output changes in the health indicator of the user in a form of a table or a change graph from a time between when the user is not smoking using the additional device to after the user smokes using the additional device.

17. The electronic device of claim 16, wherein the heath indicator comprises at least one of a blood pressure, a blood oxygen saturation, a skeletal muscle mass, or a basal metabolic rate.

* * * * *